United States Patent

Nishiyama et al.

[15] 3,681,527

[45] Aug. 1, 1972

[54] FACSIMILE READING AND RECORDING DEVICE

[72] Inventors: Shizuo Nishiyama, Kamakura-shi; Makoto Tanaka, Musashino-shi, both of Japan

[73] Assignee: Hitachi, Ltd., Tokyo, Japan

[22] Filed: March 10, 1969

[21] Appl. No.: 805,726

[30] Foreign Application Priority Data

March 15, 1968 Japan........................43/16481

[52] U.S. Cl. ..............178/6.6 A, 178/7.2, 346/74 ES

[51] Int. Cl. .......H04n 1/04, H04n 1/30, G03g 15/00

[58] Field of Search......................178/6.6 A, 7.1, 7.2; 346/74 ES

[56] References Cited

UNITED STATES PATENTS

| | | | |
|---|---|---|---|
| 3,343,142 | 9/1967 | Clark | 346/74 ES X |
| 3,365,543 | 1/1968 | Doi | 346/74 ES X |
| 3,040,124 | 6/1962 | Camras | 178/6.6 |
| 3,042,825 | 7/1962 | Bambara | 178/6.6 |
| 3,308,233 | 3/1967 | Button | 178/6.6 |
| 3,376,852 | 4/1968 | Weiler | 178/6.6 |

*Primary Examiner*—Howard W. Britton
*Attorney*—Craig, Antonelli & Hill

[57] ABSTRACT

A compact and low-cost facsimile reading and recording device comprising an electrically photosensitive surface, an electronic transfer system associated with said photosensitive surface and an electronic scanning head such as a pin tube disposed closely adjacent to said photosensitive surface, wherein reproduction of an image from a received facsimile signal is performed by forming an electrostatic latent image on the photosensitive surface by means of the pin tube and then transferring said latent image on to a recording medium, and readout of a picture or document is performed first by producing an electrostatic image of said picture or document on said photosensitive surface by means of an optical or mechanical scanning system and then modulating the current of the pin tube according to the electricity stored in said electrostatic image.

7 Claims, 3 Drawing Figures

PATENTED AUG 1 1972 3,681,527

INVENTORS
SHIZUO NISHIYAMA & MAKOTO TANAKA

BY Craig, Antonelli; Stewart & Hill
ATTORNEYS

FACSIMILE READING AND RECORDING DEVICE

BACKGROUND OF THE INVENTION

1. Field of the Invention

This invention relates to a facsimile device, particularly to a facsimile reading and recording device.

2. Description of the Prior Art

A facsimile device includes an image-electric transducer (that is, a reading device) for converting an image to a series of electric signals and an electro-image transducer (that is, a recording device) for converting an electric signal to an image, these two usually being separate devices. Therefore, in a conventional facsimile device, the other associated mechanisms such as driving means also have had to be provided for each of the reading and recording devices. This doubleness of the components has made the dimensions of the device proportionally larger and the price proportionally higher. It will be obvious that such a conventional structure is not desirable as a facsimile device for domestic use from an economical point of view, since a simultaneous operation of reading and recording is barely expected in domestic use.

SUMMARY OF THE INVENTION

An object of this invention is to provide a compact and low-cost facsimile device in which a single set of driving means, transducer and associated mechanisms are used for both reading and recording operations.

Another object of this invention is to provide a facsimile device which can read a page of books or bound papers besides a sheet of paper.

Other objects and features of this invention will be clarified by the following description with reference to the accompanying drawings.

DESCRIPTION OF THE PREFERRED EMBODIMENTS

Figure 1:
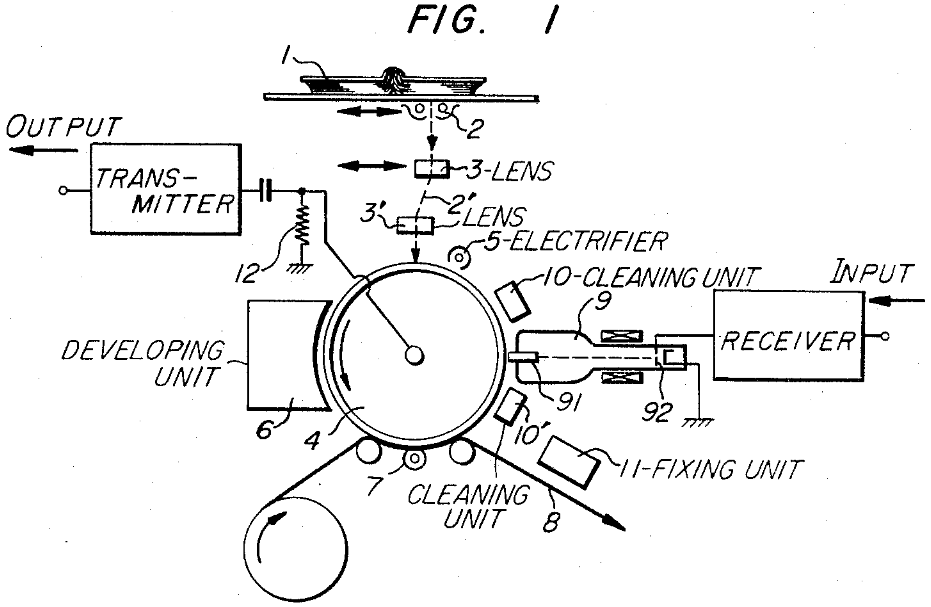
FIG. 1 is a schematic diagram illustrating the structure of an embodiment of this invention.

Referring to FIG. 1 which shows the constitution of an embodiment of this invention in a simplified form, reference numeral 1 indicates an original document such as a sheet of a manuscript or a book, 2 a light source, 3 and 3' optical lenses, 4 an electrically photosensitive drum, 5 an electrifier, 6 a developing unit, 7 an image transfer device, 8 a sheet of recording paper, 9 a pin tube, 10 and 10' cleaning units, 11 a fixing unit, and 12 a load resistor.

In the above arrangement, an electrostatographic system is constituted by an electrically photosensitive drum 4 on the surface of which is vapor-deposited a uniform layer of photoconductive material such as amorphous selenium and which is rotated by means of a not-shown driving system, the light source 2 for irradiating the original document 1, an optical system including the lenses 3, 3' for focusing the reflected light 2' from the document 1 on the surface of the drum 4, as well as the developing unit 6, electrifier 5, image transfer device 7, recording paper 8 and fixing unit 11 and cleaning units 10, 10' disposed around and adjacent to the drum 4. As this electrostatographic system can be readily composed using the known technique, detailed explanation on this part of the device is omitted in this specification. This invention is featured, among others, by the incorporation of the pin tube 9 which is provided with an array of pins sealed through the face plate of a Braun-tube-like electron tube and which is disposed with the pin head 91 facing the surface of the drum with a small gap therebetween.

The process through which an electrostatic latent image is produced on the drum 4 is as follows. A thin strip of light 2' reflected from the document 1 which is irradiated with light from the source 2, is focused on the surface of the drum 4 through the lens system 3, 3', while said light source 2 and the lens system 3, 3' are moved in synchronization with the rotation of the drum 4. As the surface of the drum 4 is uniformly electrified by the electrifier 5, an electrostatic image is produced on the surface of the drum 4 according to the above-mentioned focused light.

In a reading operation of the device, the developing unit 6, fixing unit 11 and image transfer device 7 are made ineffective, and further, the recording paper 8 and one of the cleaning units 10' are removed from the drum 4. When the electrostatic image on the drum 4 comes to face the pinhead 91, that is, an array of pins scanned by an electron beam, the electric charge of the image acts on the pins to affect the beam current. This is, the current flowing through the pin tube 9, pin head 91, drum 4 and the load resistor 12 to the ground, varies depending on the distribution of electric charge on the surface of the drum 4, that is, the latent image scanned by the electron beam through the intermediary of the pinhead 91. Accordingly, an electric signal appears across the load resistor 12. This electric signal is sent, through a transmitter and a wired or wireless channel, to a facsimile receiver placed at a distant location.

In a recording operation of the device, a facsimile signal received and demodulated through the receiver is applied to the control grid 92 of the pin tube 9 to control the beam current according to the signal. The drum 4 is encased in a black box and the window for admitting the light 2' in the reading operation is shut during the recording operation. One of the cleaning units 10 is pulled up and the other unit 10' is brought to operation. Further, the electrifier 5, light source 2 and lens system 3, 3' are made inoperative.

As is well known, the surface of the drum 4 which is coated with a photosensitive film has a high electric resistivity when it is not illuminated. Accordingly, the electric charge according to the facsimile signal is transferred to the surface of the rotating drum 4 through the pinhead 91 and is deposited thereon to form a latent electrostatic image corresponding to the original documents. This latent image is developed with toner through the developing unit 6, and is transferred on the recording paper 8 through the transfer device 7, and is then permanently fixed through the fixing unit 11. Thus, the recording of a facsimile information is completed.

It will be obvious that the above-described electrographic process may be substituted by any other known technique for obtaining a fixed record. For example, instead of using the developing unit 6, the latent image on the drum 4 may first be transferred on to the recording paper 8 and then developed with toner.

Of course, the above described apparatus can be used as a xerographic printer in the same manner as the known type of such printers. In that case, it is not necessary to activate the pin tube.

Figure 2:
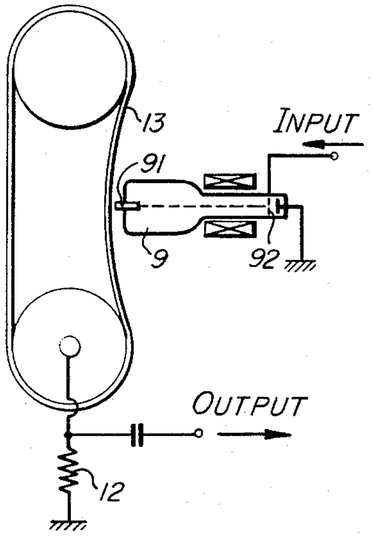
FIG. 2 shows the essential part of another embodiment of this invention.

In the embodiment shown in FIG. 2, the photosensitive drum 4 as shown in FIG. 1 is replaced by an electrically photosensitive flexible belt 13 lined with a conductive layer, and the pinhead 91 of the pin tube 9 is disposed closely adjacent to the surface of this belt 13. The other components such as the optical system, the image transfer device and the developing unit are not shown for the simplicity of the drawing.

Figure 3:
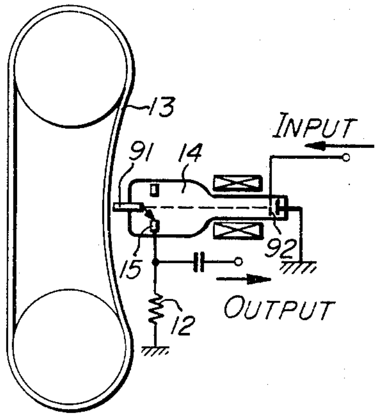
FIG. 3 shows a similar part as shown in FIG. 2 except that a different type of pin tube is used.

The pin tube 9 used in this invention may have an electrode arrangement of the same structure as that of known electron tubes such as the ordinary pin tube, image orthicon or vidicon, the required operating condition being obtained by appropriately controlling the voltages imposed on the respective electrodes. belt In the embodiment shown in FIG. 3, a pin tube 14 of a structure different from that shown in FIG. 2 is used. Such a pin tube 14 is provided with an electrode 15 for collecting reflected beams. As intensity of the reflected beam varies depending on the amount of the electric charge deposited on the bett 13, an electric signal representing the amount of the charge is produced across the load resistor 12 connected between the collecting electrode and the ground. This signal is sent to a facsimile receiver located at a distant place.

As described above, according to this invention, a pin tube is incorporated in a composite arrangement consisting of an electrically photosensitive drum or belt and an electrostatographic system utilizing said drum or belt, the pin head of said pin tube being disposed in contact with or adjacent to the surface of said drum or belt, and said pin tube being used for readout of the document as well as recording of the image in a facsimile system. Therefore, a very compact and low-price two-way device is obtained which requires only one set of driving system and can read a book or similar bound matter directly.

We claim:

1. A facsimile reading and recording device comprising a movable member having an electrically photosensitive surface which is cyclically moved at a constant speed, an optical system for producing an electrostatic image of the content of the document on said photosensitive surface, a pin tube disposed with the pin head thereof in contact with or adjacent to said photosensitive surface, and an electrostatographic system utilizing said photosensitive surface and including charging means for uniformily charging said photosensitive surface, electrostatic image developing means, image transfer means, fixing means and cleaning means all disposed adjacent to said photosensitive surface and effectively detachable from said photosensitive surface, and coupling means for electrically connecting said pin head of said pin-tube to a signal transmitter by the medium of said photosensitive surface; said movable member having said photosensitive surface, said pin-tube, said developing means, said image transfer means, said fixing means, said cleaning means, and a signal receiver with an output connected to said pin-tube constituting a facsimile receiver, while said movable member having said photosensitive surface, said optical system, said pin-tube, said charging means, said coupling means and a signal transmitter constitute a facsimile transmitter.

2. A facsimile reading and recording device as defined in claim 1, wherein said movable member having an photosensitive surface is a cylindrical body rotatable around the axis thereof.

3. A facsimile reading and recording device as defined in claim 1, wherein said movable member having an photosensitive surface is an endless belt.

4. A facsimile reading and recording device as defined in claim 1, wherein said pin tube is provided with a reflected beam collector electrode for providing an electric current depending on the amount of the reflected electrons.

5. An apparatus comprising in combination:

a movable member having an electrically photosensitive surface;

means, coupled to said member, for moving said member cyclically at a substantially constant speed;

means, optically coupled with said movable member, for producing an electrostatic image of an object on said photosensitive surface;

a pin tube disposed with a pin head thereof in contact with or immediately adjacent said photosensitive surface;

an electrostatographic imaging system retractably coupled to said photosensitive surface for recording thereon an electrostatic image carried on said photosensitive surface comprising a source of recording paper, an image transfer device and means for passing said recording paper along said movable member in the direction of movement thereof, for transferring the electrostatic image carried on said photosensitive surface to said recording paper for obtaining a permanent record thereof; and a facsimile receiving and transmitting system including transmitter means, coupled to said pin tube, for generating an electric signal representative of the intensity of the electron beam current of said pin tube during the scanning of a facsimile image produced on said photosensitive surface associated therewith; and receiver means, coupled to said pin tube and responsive to a modulating signal applied to said pin tube representative of a facsimile image to be recorded, for modulating the electron beam current of said pin tube, to thereby record on said movable member a facsimile image corresponding to image information modulated on said signal.

6. An apparatus according to claim 5, wherein said movable member comprises a cylindrical body rotatable by said moving means about the axis thereof.

7. An apparatus according to claim 5, wherein said movable member comprises an endless belt.

* * * * *